(12) United States Patent
Huang

(10) Patent No.: US 9,900,855 B2
(45) Date of Patent: Feb. 20, 2018

(54) METHOD AND ASSOCIATED TIME MANAGER FOR MANAGING TIME RELATION BETWEEN SYSTEM TIMES OF DIFFERENT REMOTE SYSTEMS

(71) Applicant: MEDIATEK Inc., Hsin-Chu (TW)

(72) Inventor: Sheng-Yu Huang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 67 days.

(21) Appl. No.: 15/147,941

(22) Filed: May 6, 2016

(65) Prior Publication Data
US 2017/0164306 A1     Jun. 8, 2017

Related U.S. Application Data

(60) Provisional application No. 62/264,368, filed on Dec. 8, 2015.

(51) Int. Cl.
| | |
|---|---|
| H04W 56/00 | (2009.01) |
| H04W 24/08 | (2009.01) |
| G01S 19/00 | (2010.01) |
| G01S 1/00 | (2006.01) |
| H04W 84/12 | (2009.01) |

(52) U.S. Cl.
CPC .......... H04W 56/001 (2013.01); G01S 1/00 (2013.01); G01S 19/00 (2013.01); H04W 24/08 (2013.01); H04W 56/00 (2013.01); H04W 84/12 (2013.01)

(58) Field of Classification Search
CPC ... H04W 56/001; H04W 56/00; H04W 24/08; H04W 84/12; G01S 1/00; G01S 19/00
See application file for complete search history.

(56) References Cited

U.S. PATENT DOCUMENTS

| | | |
|---|---|---|
| 6,603,978 B1 | 8/2003 | Carlsson et al. |
| 2005/0146462 A1 | 7/2005 | Abraham et al. |
| 2008/0018530 A1 | 1/2008 | Farmer |
| 2009/0146871 A1 | 6/2009 | Abraham et al. |
| 2015/0103818 A1 | 4/2015 | Kuhn et al. |

FOREIGN PATENT DOCUMENTS

EP     2149798 A1     2/2010

OTHER PUBLICATIONS

EP Search Report dated May 9, 2017 in European application (No. 16170667.6-1875).

*Primary Examiner* — Mohammad S Anwar
(74) *Attorney, Agent, or Firm* — McClure, Qualey & Rodack, LLP

(57) ABSTRACT

The present invention provides a method and an associated time manager for managing a time relation between system times of different remote systems, including: at a first moment, obtaining a first value of a first system time and accessing a periodically updating reference counter to obtain a first count; at a second moment, updating the time relation by: obtaining a second value of a second system time along with a second count, and calculating a second value of the first system time by summing the first value of the first system time and an extrapolation interval calculated according to a difference between the first count and the second count. Thus, when synchronization with a first remote system ends, a fourth value of the first system time may be calculated according to a fourth value of the second system time and a previously stored time relation.

18 Claims, 7 Drawing Sheets

METHOD AND ASSOCIATED TIME MANAGER FOR MANAGING TIME RELATION BETWEEN SYSTEM TIMES OF DIFFERENT REMOTE SYSTEMS

This application claims the benefit of U.S. provisional application Ser. No. 62/264,368, filed Dec. 8, 2015, the subject matter of which is incorporated herein by reference.

FIELD OF THE INVENTION

The present invention relates to method and associated time manager for managing time relation between system times of different remote systems, and more particularly, to method and associated time manager for managing the time relation locally in a terminal without extra services and interoperation of the remote systems.

BACKGROUND OF THE INVENTION

Modern mobile equipment, such as smart phone, wearable gadget (eye glasses, wrist watch, etc.), portable computer, tablet computer, hand-held game console, automobile navigation device, digital camera and digital camcorder, etc., is equipped with wireless accessibilities to different remote systems for various services, including mobile telecommunication systems of different generations (e.g., 3G and 4G) for interchanging voice, text messages, e-mails and/or data, global navigation satellite positioning system (GLASS) for locating, and/or local network system (e.g., Wi-Fi network system) for interchanging information.

To correctly and fully access and utilize services involving a remote system, the mobile equipment works as a terminal to synchronize with the remote system by adjusting local clock and/or local signal timing to keep on aligning timing received and/or retrieved from the remote system, e.g., aligning start, middle and/or end of symbol(s), frame(s), sub-frame(s), packet(s), beacon(s), pilot(s), header(s), delimiter(s) and/or synchronization word(s) in a remote signal received from the remote system. After achieving synchronization with a remote system, the terminal obtains a corresponding system time via synchronization with the remote system; for example, the terminal may obtain a value of the system time whenever timing alignment occurs during synchronization with the remote system, wherein value of the system will update (increase or decrease) with time, and therefore can reflect elapse of time. For example, if the remote system is a mobile telecommunication system, the corresponding system time may be valued in terms of SFN (system frame number), and timing alignments to the remote system may be achieved by performing frame synchronizations. If the remote system is GNSS, the corresponding system time may be valued in terms of TOW (time of week), and timing alignments to the remote system may be achieved by performing PVT (position, velocity, time) fixings. If the remote system is Wi-Fi network system, the corresponding system time may be valued in terms of symbol timing, and timing alignments to the remote system may be achieved by performing symbol synchronizations. When the synchronization with the remote system ends or is lost, e.g., when the terminal stops receiving remote signals from the remote system, the terminal cannot track and maintain the corresponding system time, since there is no remote signal for the terminal to align.

SUMMARY OF THE INVENTION

While a terminal has accesses to multiple remote systems, the terminal tracks multiple system times respectively via synchronizations with the multiple remote systems. It is beneficial for the terminal to build, update and store a time relation between different system times during synchronization with different remote systems; for example, after synchronization with a first remote systems ends and resynchronization with the first remote system later desired, the terminal may speed up the resynchronization by locally exploiting the previously stored time relation and a system time of a second remote system which is still synchronized with the terminal.

An objective of the invention is providing a method for managing a time relation between system times of different remote systems by a terminal (e.g., 10 in FIG. 1). The method may include: periodically updating a count of a reference counter (e.g., 130 in FIG. 1) according to a local clock (e.g., 152) of the terminal; synchronizing with a first remote system (e.g., 12) of the different remote systems; at a first moment (e.g., $t_0$ in FIG. 6) after synchronized with the first remote system, obtaining a first value (e.g., $T_0$) of a first system time (e.g., T) via synchronization with the first remote system and accessing the reference counter to obtain a first count (e.g., $Tick_0$); synchronizing with a second remote system (e.g., 16 in FIG. 1) of the different remote systems; at a second moment (e.g., $t_1$ in FIG. 6) after synchronized with the second remote system, updating the time relation by (e.g., 606 in FIG. 6 or 410 in FIG. 4): obtaining a second value (e.g., $S_1$) of the second system time via synchronization with the second remote system, accessing the reference counter to obtain a second count (e.g., $Tick_1$), calculating an extrapolation interval (e.g., $(Tick_1 - Tick_0)*T_{tick}*(1+D_{tick})$) according to a difference between the first count and the second count, calculating a second value (e.g., $T_1$) of the first system time by summing the first value of the first system time and the extrapolation interval, and storing the second value of the first system time and the second value of the second system time as updated content of the time relation.

The method may further include (e.g., 612 in FIG. 6 or 508 in FIG. 5): at a fourth moment (e.g., $t_n$ in FIG. 6) after synchronization with the first remote system ends, calculating a fourth value (e.g., $T_n$) of the first system time by: obtaining a fourth value (e.g., $S_n$) of the second system time via synchronization with the second remote system, accessing a time relation updated at a third moment (e.g., $t_x$) before synchronization with the first remote system ends, so as to obtain a stored value (e.g., $T_x$) of the first system time and a stored value (e.g., $S_x$) of the second system time; calculating an expansion interval (e.g., $(S_n-S_x)*T_S(1+D_S)$) according to a difference between the fourth value of the second system time and the stored value of the second system time, and summing the stored value of the first system time and the expansion interval. The fourth value of the first system time then can be exploited for faster resynchronization with the first remote system.

In an embodiment, calculating the aforementioned expansion interval may include: multiplying a unit timing duration (e.g., $T_S$ in FIG. 6) with the difference between the fourth value of the second system time and stored value of the second system time, wherein the unit timing duration is associated with a time span per unit value of the second system time.

In an embodiment, updating the time relation at the second moment may further include (e.g., 412 in FIG. 4): calculating a first time difference according to a difference between two previous values of the first system time obtained via synchronization with the first remote system respectively at two different previous moments which are not later than the second moment, calculating a second time difference according to a difference between two prior values of the second system time obtained via synchronization with the second remote system respectively at the two different prior moments, calculating a clock drift (e.g., $D_S$ in 412) according to a ratio of the first time difference and the second time difference, and storing the clock drift as a portion of the updated content of the time relation (e.g., 414 in FIG. 4). And, calculating the expansion interval may include: calculating a compensation factor (e.g., $(1+D_S)$ in 508 of FIG. 5 or 612 of FIG. 6) according to the clock drift, multiplying a unit timing duration (e.g., $T_S$ in FIG. 5 or 6) with the compensation factor and the difference between the fourth value of the second system time and stored value of the second system time, wherein the unit timing duration is associated with a time span per unit value of the second system time.

In an embodiment, calculating the aforementioned extrapolation interval may include: multiplying a unit counter duration (e.g., $T_{tick}$ in 606 of FIG. 6) with the difference between the first count and the second count, wherein the unit counter duration is associated with a time span per count of the reference counter.

In an embodiment, calculating the aforementioned extrapolation interval may include: calculating a system time difference according to a difference between two preceding values of the first system time obtained via synchronization with the first remote system 12 respectively at two different preceding moments which are not later than the second moment, calculating a count difference according to a difference between two preceding counts of the reference counter respectively obtained at the two different preceding moments, calculating a second compensation factor (e.g., (1+Dtick) in FIG. 6) according to a ratio of the system time difference and the count difference, and multiplying a unit counter duration (e.g., Ttick) with the second compensation factor and the difference between the first count and the second count, wherein the unit counter duration is associated with a time span per count of the reference counter.

Synchronizing with the first remote system may be achieved via a first interface circuit (e.g., one of 102 to 108 in FIG. 1), and the method may further include (e.g., 206 in FIG. 2): while obtaining the first value of the first system time and the first count, compensating hardware latencies of the first interface circuit beforehand.

In an embodiment, the method may further include (e.g., 812 in FIG. 8): at a sixth moment (e.g., $t'_n$ in FIG. 8) after ending synchronization with the second remote system, calculating a sixth value (e.g., $S'_n$) of the second system time by: obtaining a sixth value (e.g., $T_n$) of the first system time via synchronization with the first remote system, accessing a time relation updated at a fifth moment (e.g., $t'_x$) before ending synchronization with the first remote system, so as to obtain a stored value (e.g., $T_x$) of the first system time and a stored value (e.g., $S_x$) of the second system time; calculating a second expansion interval according to a difference between the sixth value of the first system time and the stored value of the first system time, and summing the stored value of the second system time and the second expansion interval.

The first remote system with the first system time and the second remote system with the second system time may be different two of following: a GNSS with a system time valued in terms of TOW, a mobile telecommunication system with a system time valued in terms of SFN, and a Wi-Fi network system with a system time valued in terms of symbol timing.

An objective of the invention is providing a time manager (e.g., 100 in FIG. 1) embedded in a terminal for managing a time relation between system times of different remote systems, including a reference counter, a memory and a processor coupled to the reference counter and the memory. The terminal includes a first interface circuit and a second interface circuit. The first interface circuit may synchronize with a first emote system of the different remote systems, and, at a first moment after synchronized with the first remote system, obtain a first value of a first system time via synchronization with the first remote system, and access the reference counter to obtain a first count. The second interface circuit may synchronize with a second remote system of the different remote systems, and, at a second moment after synchronized with the second remote system, obtain a second value of the second system time via synchronization with the second remote system, and access the reference counter to obtain a second count. At the second moment, the processor may update the time relation by calculating an extrapolation interval according to a difference between the first count and the second count, calculating a second value of the first system time by summing the first value of the first system time and the extrapolation interval, and storing the second value of the first system time and the second value of the second system time in the memory as updated content of the time relation. While obtaining the first value of the first system time and the first count, the first interface circuit may further compensate hardware latencies of the first interface circuit beforehand. At a fourth moment after synchronization with the first remote system ends, the second interface circuit may further obtain a fourth value of the second system time via synchronization with the second remote system, and the processor may further calculate a fourth value of the first system time by: accessing a time relation updated at a third moment before synchronization with the first remote system ends, so as to obtain a stored value of the first system time and a stored value of the second system time; calculating an expansion interval according to a difference between the fourth value of the second system time and the stored value of the second system time, and summing the stored value of the first system time and the expansion interval.

At the second moment, the processor may update the time relation further by: calculating a first time difference according to a difference between two previous values of the first system time obtained via synchronization with the first remote system respectively at two different previous moments which are not later than the second moment, calculating a second time difference according to a difference between two prior values of the second system time obtained via synchronization with the second remote system respectively at two different prior moments which are not later than the second moment, calculating a clock drift according to a ratio of the first time difference and the second time difference, and storing the clock drift in the memory as a portion of the updated content of the time relation.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
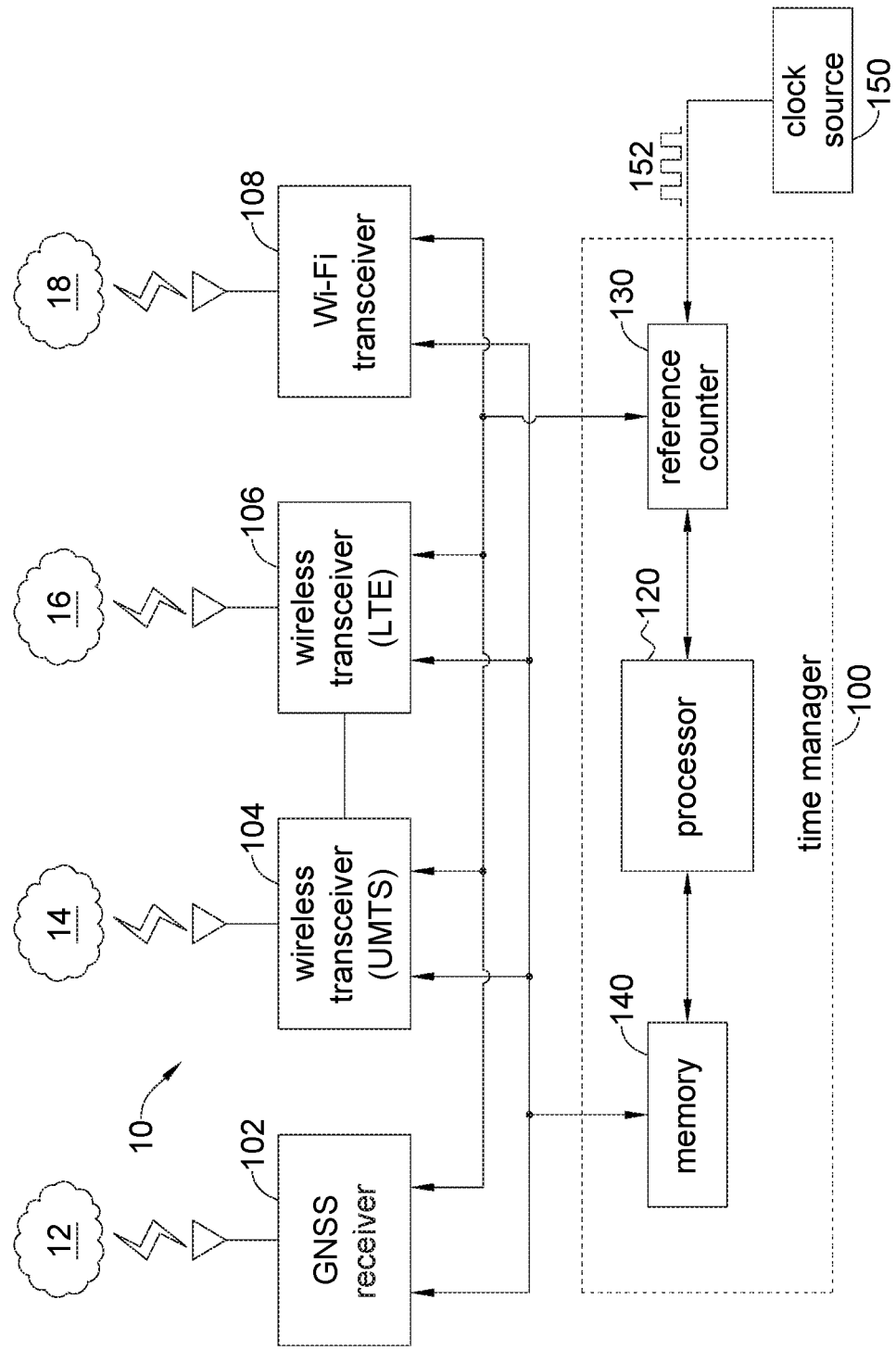
FIG. 1 illustrates a time manager in a terminal according to an embodiment of the invention.

Please refer to FIG. 1 illustrates a time manager 100 embedded in a terminal 10. The terminal 10 may be a mobile equipment. The time manager 100 may include a processor 120, a reference counter 130 and a memory 140, and the terminal 10 may further include a local clock source 150 and multiple interface circuits, e.g., 102, 104, 106 and 108 in the example of FIG. 1. The clock source 150 is coupled to the reference counter 130 for providing a local clock 152 to the reference counter 130; for example, the clock source 150 may be a crystal oscillation circuit. According to triggering of the local clock, the reference counter 130 periodically updates a count (e.g., by counting up or down). The processor 120 and each of the interface circuit 102 to 108 are coupled to the reference counter 130 for obtaining (e.g., reading) the count from the reference counter 130. The processor 120 and each of the interface circuit 102 to 108 are also coupled in the memory 140 for storing (writing) digital contents in the memory 140 and/or accessing (reading) stored contents from the memory 140.

In the example of FIG. 1, the interface circuit 102 may be a GNSS receiver capable of receiving signals from a remote system 12 which includes multiple satellites; by receiving signals from the remote system 12 and performing PVT fixing according to received signals, the interface circuit 102 updates a system time valued in terms of TOW. The interface circuit 104 may be a wireless transceiver for UMTS (universal mobile telecommunications system) capable of interchanging signals with a remote system 14 which includes multiple base transceiver stations; by performing frame synchronization with the remote system 14, the interface circuit 104 updates a system time valued in terms of SFN. Similarly, the interface circuit 106 may be a wireless transceiver for LTE (long term evolution) capable of interchanging signals with a remote system 16 which includes multiple base transceiver stations; by performing frame synchronization with the remote system 16, the interface circuit 106 updates a system time valued in terms of SFN. The interface circuit 108 may be a wireless transceiver for Wi-Fi network capable of interchanging signals with a remote system 18 which includes one or more network nodes (e.g., hotspots or access points); by performing symbol synchronization with the remote system 16, the interface circuit 106 updates a system time valued in terms of symbol timing. Each of the interface circuits 102 to 108 may include antenna(s) for receiving (and transmitting) wireless signal, also hardware circuitry (e.g., analog frontend and/or digital backend, not shown) for implementing functions of physical layer (and higher layer(s) if required) of associated protocols.

Figure 2:
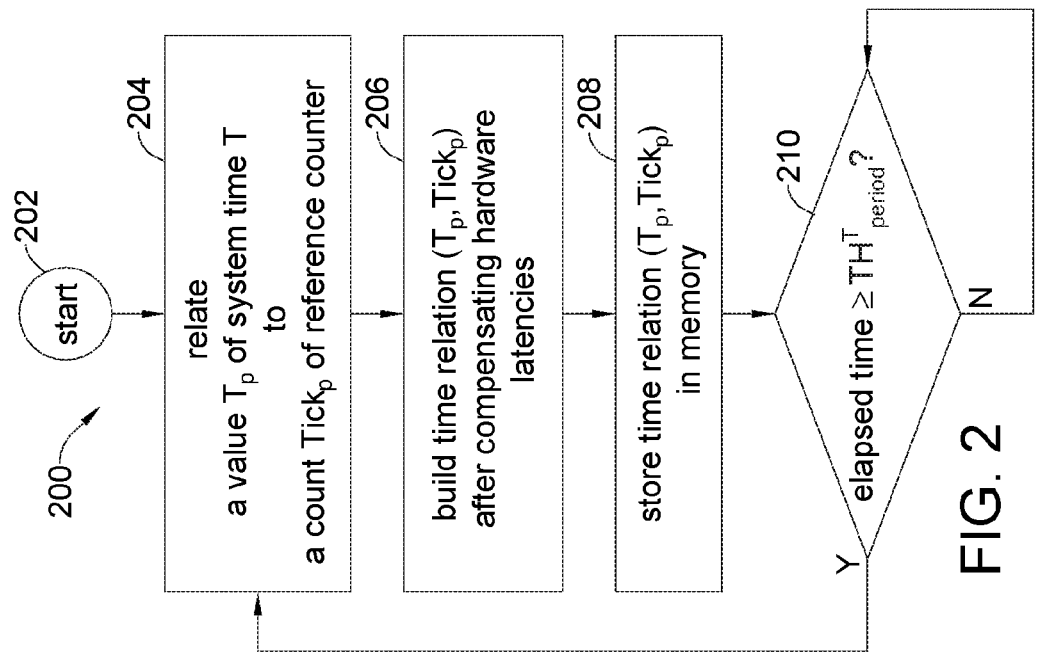

Along with FIG. 1, please refer to FIG. 2 illustrates a flowchart 200 for maintaining a time relation (T,Tick) between a system time T and a count Tick of the reference counter 130. For convenience of understanding, it is assumed that the system time T is the system time obtained and updated by the interface circuit 102 via synchronization (e.g., PVT fixings) with the remote system 12. The flowchart 200 may include the following steps:

Step 202: The interface circuit 102 may start executing the flowchart 200 during synchronization with the remote system 12.

Step 204: When the interface circuit 102 achieves a PVT fixing, the interface circuit 102 obtains a value $T_p$ of the system time T, and also accesses the reference counter 130 to obtain a count $Tick_p$. Thus the value $T_p$ is related to the count $Tick_p$ to reflect that the value $T_p$ corresponds to the count $Tick_p$.

Step 206: The interface circuit 102 (or the processor 120) builds a time relation by a tuple $(T_p,Tick_p)$. While obtaining the value $T_p$ and the count $Tick_p$, the interface circuit 102 (or the processor 120) may compensate hardware latencies of the interface circuit 102 beforehand. The hardware latencies may include time elapsed between "wireless signals reaching antenna of the interface circuit 102" and "achieving PVT fixing according to the signals." The hardware latencies may be estimated (e.g., by calibration) and subtracted from obtained value of the system counter T and/or obtained count of the reference counter 130, so the resultant time relation $(T_p,Tick_p,)$ excludes hardware latencies introduced by operations of the interface circuit 102.

Step 208: The interface circuit 102 (or the processor 120) stores the time relation $(T_p,Tick_p)$ in the memory 140.

Step 210: If time elapsed after step 208 is not longer than a threshold $TH^T_{period}$, the interface circuit 102 continues waiting; when the time elapsed after step 208 becomes greater than or equal to a threshold $TH^T_{period}$, the interface circuit 102 (or the processor 120) iterates back to step 204 to build and store a new time relation, e.g., $(T_{p+1},Tick_{p+1})$ with a new value $T_{p+1}$ of the system time T and a new count $Tick_{p+1}$ obtained at a new PVT fixing. The threshold $TH^T_{period}$ may be decided according to clock drift between system time T and the reference counter 130, also according to time accuracy requirement. For example, if the local clock 152 for triggering the reference counter 130 suffers greater clock drift (variation of clock rate) with respect to the system time T, then the threshold $TH^T_{period}$ may be set shorter. Similarly, if higher time accuracy is required, the threshold $TH^T_{period}$ may be set shorter. Shorter threshold $TH^T_{period}$ may cause the time relation between the system time S and the reference counter 130 to be refreshed more frequently.

Figure 3:
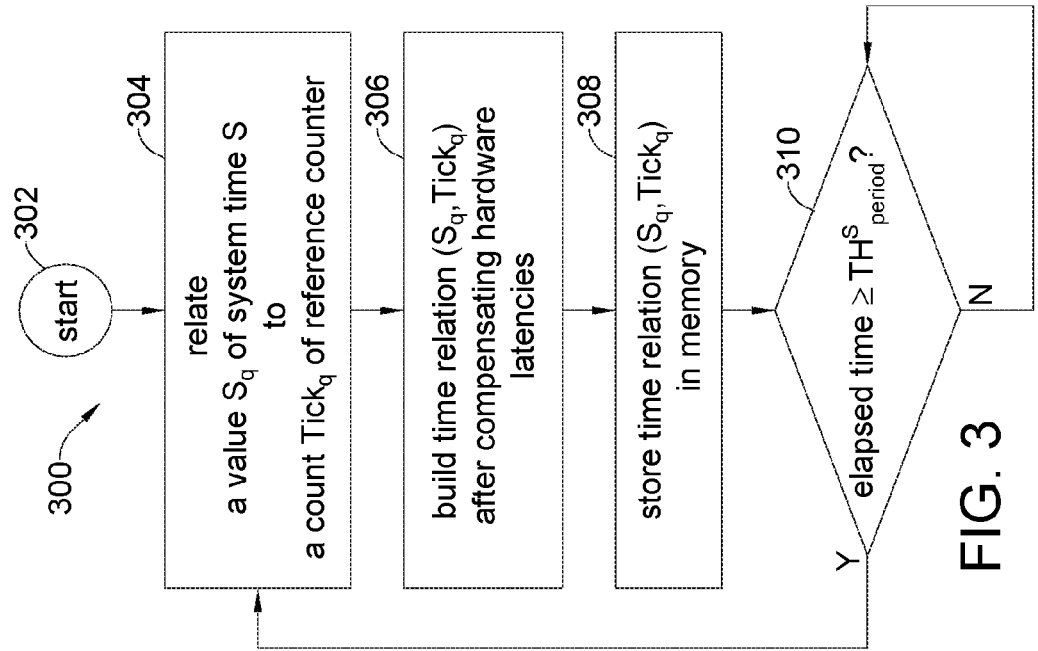
FIG. 2 and FIG. 3 respectively illustrate flowcharts for maintaining a time relation between a system time and a count of the reference counter in FIG. 1.

Along with FIG. 1 and FIG. 2, please refer to FIG. 3 illustrates a flowchart 300 for maintaining a time relation (S,Tick) between a system time S and a count Tick of the reference counter 130. For convenience of understanding, it is assumed that the system time S is the system time obtained and updated by the interface circuit 106 via frame synchronization with the remote system 16. Similar to the flowchart 200, the interface circuit 106 starts executing the flowchart 300 (step 302) during synchronization with the remote system 16, obtains and relates a value $S_q$ of the system time S to a count $Tick_q$ of the reference counter 130 when a frame synchronization is achieved (step 304), builds a time relation ($S_q$,$Tick_q$) after compensating hardware latencies of the interface circuit 106 (step 306), stores the time relation ($S_q$,$Tick_q$) in the memory 140 (step 308), and iterates back to step 304 when time elapsed after step 304 accumulates to equal or exceed a threshold $TH^S_{period}$ (step 310), wherein the threshold $TH^S_{period}$ may be determined according to required time accuracy and/or clock drift between the system time S and the reference counter 130. The thresholds $TH^T_{period}$ and $TH^S_{period}$ may be identical or different. Period of the local clock 152 may be much shorter than an interval between consecutive PVT fixings of the interface circuit 102, an interval between consecutive frame synchronization of the interface circuit 106, as well as the thresholds $TH^T_{period}$ and $TH^S_{period}$.

Following the flowcharts 200 and 300, the system times T and S are related to a common time axis marked by counts Tick of the reference counter 130. Although hardware latencies of the interface circuits 102 and 106 may be different, compensations at steps 206 and 306 suppress such difference respectively by tracking the system time T back to the moments when signals from the remote system 12 reach antenna of the interface circuits 102, and tracking the system time S back to the moments when signals from the remote system 16 reach antenna of the interface circuits 106. According to the time relations (T,Tick) and (S,Tick), the different system times T and S respectively obtained via synchronizations with the remote systems 12 and 16 may be related together by executing a flowchart 400 shown in FIG. 4.

Figure 4:
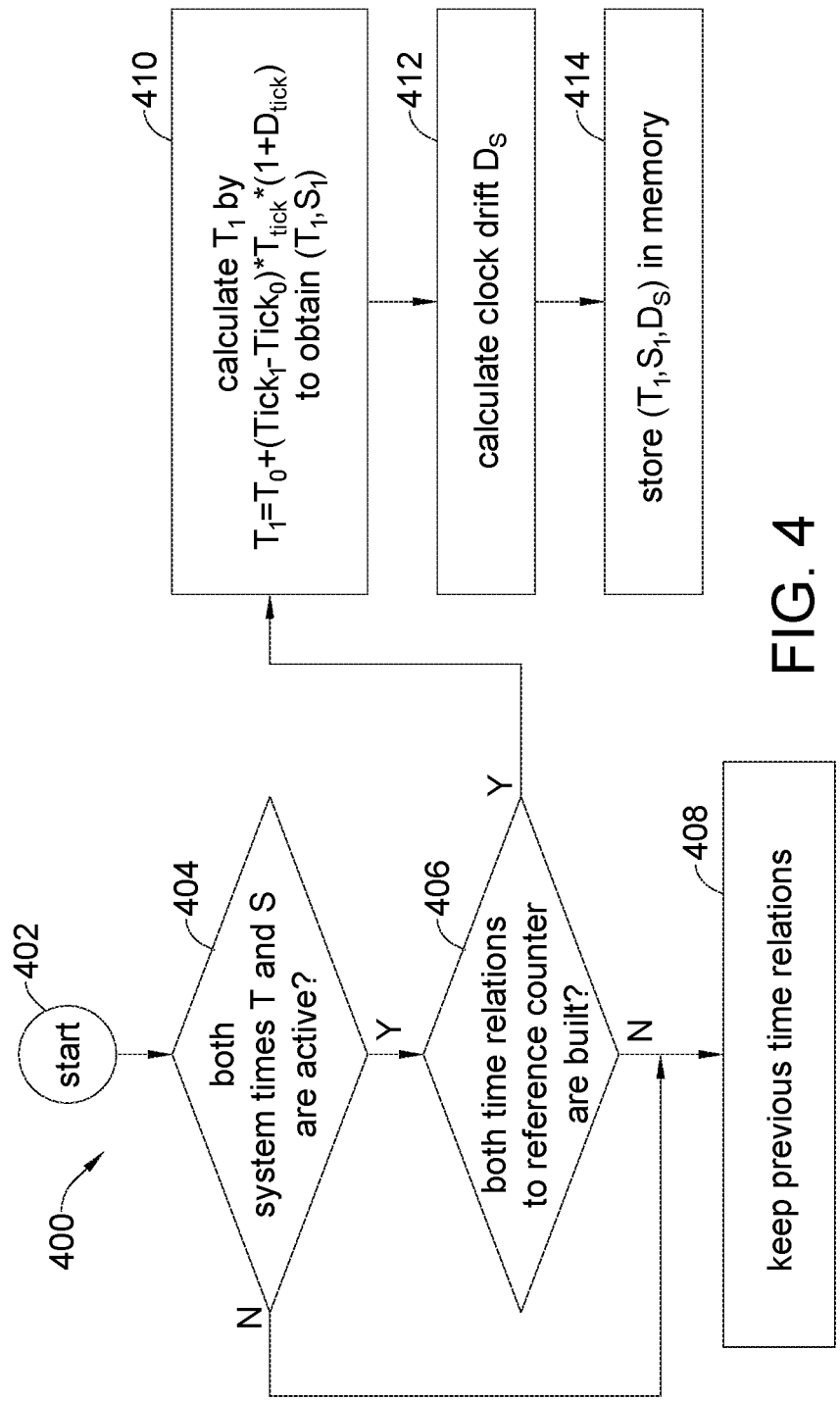
FIG. 4 illustrates a flowchart for maintaining a cross-system time relation between two different system times according to the time relation of FIG. 2 or FIG. 3.

Along with FIG. 2 and FIG. 3, please refer to FIG. 4 for relating system times T and S to build and maintain a cross-system time relation (T,S,$D_S$). The flowchart 400 may include the following steps:

Step 402: The processor 120 starts the flowchart 400.

Step 404: If both the interface circuits 102 and 106 are synchronized respectively with the remote systems 12 and 16 to keep the system times T and S active (available), the processor 120 proceeds to step 406, otherwise proceeds to step 408.

Step 406: If both the time relations (T,Tick) and (S,Tick) are built (respectively by execution of the flowcharts 200 and 300), the processor 120 proceeds to step 410, otherwise proceeds to step 408.

Step 408: The processor 120 keeps previous time relation (T,S,$D_S$).

Step 410: At a current moment $t_1$, the interface circuit 106 performs a frame synchronization with the remote system 16 to obtain a value $S_1$ of the system time 5, also concurrently accesses the reference counter 130 to obtain a count $Tick_1$, so as to build a time relation ($S_1$,$Tick_1$) by executing step 306. According to the count $Tick_1$ and a time relation ($T_0$,$Tick_0$) which is previously built at an earlier moment $t_0$ by executing step 206 with a (latency compensated) value $T_0$ of the system time T obtained by performing a PVT fixing with the remote system 12 at the moment $t_0$ and a count $Tick_0$ obtained by accessing the reference counter 130 at the moment $t_0$, the processor 120 calculates an extrapolation interval according to a difference ($Tick_1$−$Tick_0$) between the counts $Tick_0$ and $Tick_1$, and calculates a value $T_1$ of the system time T by summing the value $T_0$ and the extrapolation interval. The resultant calculated value $T_1$ may be regarded as a value of the system T at the moment $t_1$, and the tuple ($T_1$,$S_1$) may be built to cross-correlate concurrent values of the system times T and S.

Although the interface circuit 106 performs a frame synchronization at the moment $t_1$ and therefore obtain the value $S_1$ of the system time S, the interface circuit 102 does not have to perform a PVT fixing concurrently at the moment $t_1$. Unlike the value $T_0$ which is obtained via a PVT fixing at the moment $t_0$, if the interface circuit 102 does not perform another PVT fixing at the moment $t_1$, the value $T_1$ of the system time T at the moment $t_1$ cannot be obtained via PVT fixing. However, in order to build the relation ($T_1$,$S_1$) at the moment $t_1$, the value $T_1$ of the system time T is estimated by extrapolating the time relation ($T_0$,$Tick_0$) at the moment $t_0$ to the moment $t_1$ with help of the count $Tick_1$ obtained at the moment $t_1$.

In an embodiment, the processor 120 calculates the extrapolation interval by multiplying a unit counter duration $T_{tick}$ with the difference ($Tick_1$−$Tick_0$), and calculates a value $T_1$ of the system time T by summing the value $T_0$ and the extrapolation interval, hence the value $T_1$ is calculated by $T_1=T_0+(Tick_1-Tick_0)*T_{tick}$, wherein the unit counter duration $T_{tick}$ is associated with a time span per count of the reference counter 130. For example, assuming an ideal (expected) interval for count of the reference counter 130 to update (increase or decrease) by one is X seconds, and an ideal interval for value of the system time T to update by one is Y seconds, then an ideal value of the unit counter duration $T_{tick}$ will equal X/Y. Equivalently, if an ideal interval for the reference counter 130 to update its count by A equals an ideal interval for the system time T to update its value by B, then an ideal value of the unit counter duration $T_{tick}$ will equal B/A.

However, since the local clock 152 may suffer unexpected drift with respect to the system time T, the unit counter duration Ttick may consequently drift away from its ideal value. To compensate the undesired drift, the processor 120 may calculate the expansion interval by multiplying the ideal value of the unit counter duration Ttick with a compensation factor (1+Dtick) and the difference (Tick1−Tick0), and calculate the value T1 by T1=T0+(Tick1−Tick0)*Ttick*(1+Dtick). The processor 120 may calculate the compensation factor (1+Dtick) by: calculating a system time difference (TA2−TA1) according to a difference between two preceding values TA1 and TA2 of the system time T obtained via synchronization (i.e., by performing PVT fixings) with the remote system 12 respectively at two different preceding moments tA1 and tA2 which are not later than the moment t1 (i.e., tA1<tA2≤t1); calculating a count difference (TickA2−TickA1) according to a difference between two preceding counts TickA1 and TickA2 of the reference counter 130 obtained by accessing the reference counter 130 respectively at the two different preceding moments tA1 and tA2; and calculating the compensation factor (1+Dtick) according to the ideal unit counter duration Ttick and a ratio of the system time difference (TA2−TA1) and the count difference (TickA2−TickA1), e.g., (1+Dtick)=((TA2−TA1)/(TickA2−TickA1))/Ttick.

Step 412: The processor 120 further calculates a clock drift $D_S$ by: calculating a first time difference ($T_{B2}$−$T_{B1}$) according to a difference between two previous values $T_{B1}$ and $T_{B2}$ of the system time T obtained via synchronization with the remote system 12 (e.g., obtained by performing PVT fixings) respectively at two different previous moments $t_{B1}$ and $t_{B2}$ which are not later than the moment $t_1$ (i.e., $t_{B1}$<$t_{B2}$≤$t_1$); calculating a second time difference ($S_{C2}$−$S_{C1}$) according to a difference between two prior values $S_{C1}$ and $S_{C2}$ of the system time S obtained via synchronization with the remote system 16 (e.g., obtained by performing frame synchronizations) respectively at two different prior moments $t_{C1}$ and $t_{C2}$ which are not later than the second moment $t_1$ (i.e., $t_{C1}<t_{C2} \leq t_1$); and calculating the clock drift $D_S$ according to an ideal value of a unit timing duration $T_S$ and a ratio of the first time difference $(T_{S2}-T_{S1})$ and the second time difference $(S_{C2}-S_{C1})$, e.g., $D_S=((T_{B2}-T_{B1})/(S_{C2}-S_{C1}))/T_S-1$. The moments $t_{B1}$, $t_{B2}$, $t_{C1}$ and $t_{C2}$ may be different.

The unit timing duration $T_S$ is associated with a time span per unit value of the system time S, as well as a time span per unit value of the system time T. For example, assuming an ideal (expected) interval for value of the system time S to update by one is $X_S$ seconds, and an ideal interval for value of the system time T to update by one is $X_T$ seconds, then an ideal value of the unit timing duration $T_S$ will equal $X_S/X_T$. Equivalently, if an ideal interval for the system time S to update its value by $A_S$ (e.g., increase its value from $A_0$ to $(A_0+A_S)$) equals an ideal interval for the system time T to update its value by $B_T$, then an ideal value of the unit counter duration $T_S$ will equals $B_T/A_S$. As will be described later in FIG. 5 and FIG. 6, the unit timing duration $T_S$ will be utilized to convert between values of the system times S and T. However, since the system times S and T may suffer non-ideal variation with respect to each other, the clock drift $D_S$ is calculated for compensation.

Step 414: The processor 120 stores values $T_1$, $S_1$ and the clock drift $D_S$ in the memory 140 as content of a cross-system time relation between the system times S and T.

Figure 6:
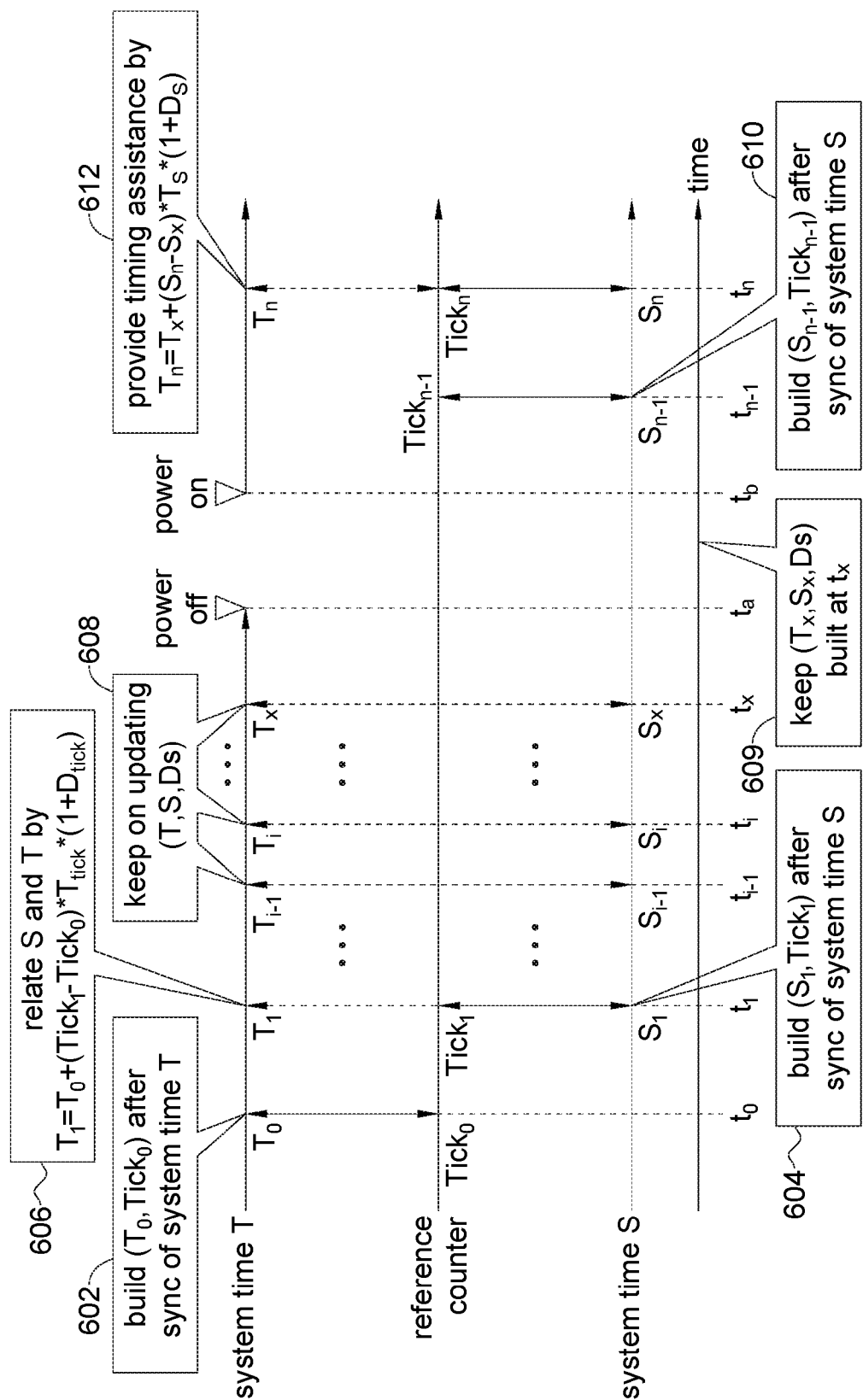
FIG. 6 illustrates an exemplary scenario applying the flowcharts shown in FIG. 2 to FIG. 5.

Along with FIG. 1 to FIG. 4, please refer to FIG. 6 illustrating execution of the flowcharts 200 (FIG. 2), 300 (FIG. 3) and 400 (FIG. 4) by an exemplary scenario; the transverse axis of FIG. 6 is time. At a moment $t_0$ after the interface circuit 102 has achieved synchronization with the remote system 12, the interface circuit 102 performs a PVT fixing, so a time relation $(T_0, Tick_0)$ is built by executing steps 204, 206 and 208 of the flowchart 200, as shown in an operation 602. At a moment $t_1$ after the interface circuit 106 has achieved synchronization with the remote system 16, the interface circuit 106 performs a frame synchronization, so a time relation $(S_1, Tick_1)$ is built by executing steps 304, 306 and 308 of the flowchart 300, as shown in an operation 604. Also at the moment $t_1$, because both system times S and T are active (step 404 in FIG. 4), the two time relations $(T_0, Tick_0)$ and $(S_1, Tick_1)$ respectively correlating the system times T and S to the reference counter 130 are built (step 406), a value $T_1$ of the system time T is calculated by executing steps 410 of the flowchart 400, and a cross-system time relation $(T_1, S_1, D_S)$ is therefore built and stored in the memory 140 by executing steps 412 and 414, as shown in an operation 606.

Steps 410, 412 and 414 of the flowchart 400 may be repeated whenever the interface circuit 102 performs a PVT fixing and/or whenever the interface circuit 106 performs a frame synchronization, as shown in an operation 608 of FIG. 6. For example, while the interface circuits 102 and 106 respectively keep synchronized with the remote systems 12 and 16, the interface circuit 102 performs a PVT fixing at a moment $t_{i-1}$ and correspondingly obtains a value $T_{i-1}$ of the system time T and a count $Tick_{i-1}$ from the reference counter 130 by a repeated execution of steps 204, 206 and 208, and the interface circuit 106 performs a frame synchronization at a moment $t_i$ and correspondingly obtains a value $S_i$ of the system time S and a count $Tick_i$ from the reference counter 130 by a repeated execution of steps 304, 306 and 308, then the processor 120 calculates a value $T_i$ of the system time T as $T_i=T_{i-1}+(Tick_i-Tick_{i-1})*T_{tick}*(1+D_{tick})$ by again executing step 414 of the flowchart 400, and accordingly builds a time relation $(T_i, S_i, D_S)$ by executing steps 410, 412 and 414 of the flowchart 400, wherein the clock drift $D_S$ at the moment $t_i$ may be calculated by $D_S((T_{D2}-T_{D1})/(S_{E2}-S_{E1}))/T_S-1$, with two previous values $T_{D1}$ and $T_{D2}$ of the system time T obtained by performing PVT fixings respectively at two different previous moments $t_{D1}$ and $t_{D2}$ (not shown) which are not later than the moment $t_i$ (i.e., $t_{D1}<t_{D2} \leq t_i$), and two prior values $S_{E1}$ and $S_{E2}$ of the system time S obtained by performing frame synchronizations respectively at two different prior moments $t_{E1}$ and $t_{E2}$ (not shown) which are not later than the moment $t_i$ (i.e., $t_{E1}<t_{E2} \leq t_i$). For example, the moments $t_{D1}$ and $t_{D2}$ may be the moments of two PVT fixings performed most close to the moment $t_i$, the moments $t_{E1}$ and $t_{E2}$ may be the moments of two frame synchronizations performed most close to the moment $t_i$. The moments $t_{D1}$, $t_{D2}$, $t_{E1}$ and $t_{E2}$ may be different.

The cross-system time relation $(T,S,D_S)$ associating the system times S and T are beneficial, e.g., for speeding up recovery of lost synchronization. In the example of FIG. 6, it is assumed that the interface circuit 102 is powered down (e.g., disabled, inactivated, suspended to idle for power saving, etc.) at a moment $t_a$ soon after a moment $t_x$ at which a time relation $(T_x, S_x, D_S)$ is built by executing steps 410, 412 and 414 of the flowchart 400, and the interface circuit 102 is powered up (e.g., enabled, activated, waken from idle, etc.) at a moment $t_b$. From the moments $t_a$ to $t_b$, since the interface circuit 102 is not active and thus fail to maintain synchronization with the remote system 12, the most recent time relation $(T_x, S_x, D_S)$ built at the moment $t_x$ is stored and kept (step 408 of the flowchart 400), as shown in an operation 609 of FIG. 6, though the interface circuit 106 may remain active and keep repeating steps 304, 306 and 308 to build (update) time relation (S,Tick) between the system time S and the reference counter 130, e.g., to build a time relation $(S_{n-1}, Tick_{n-1})$ by performing a frame synchronization at a moment $t_{n-1}$, as shown in an operation 610 of FIG. 6.

Figure 5:
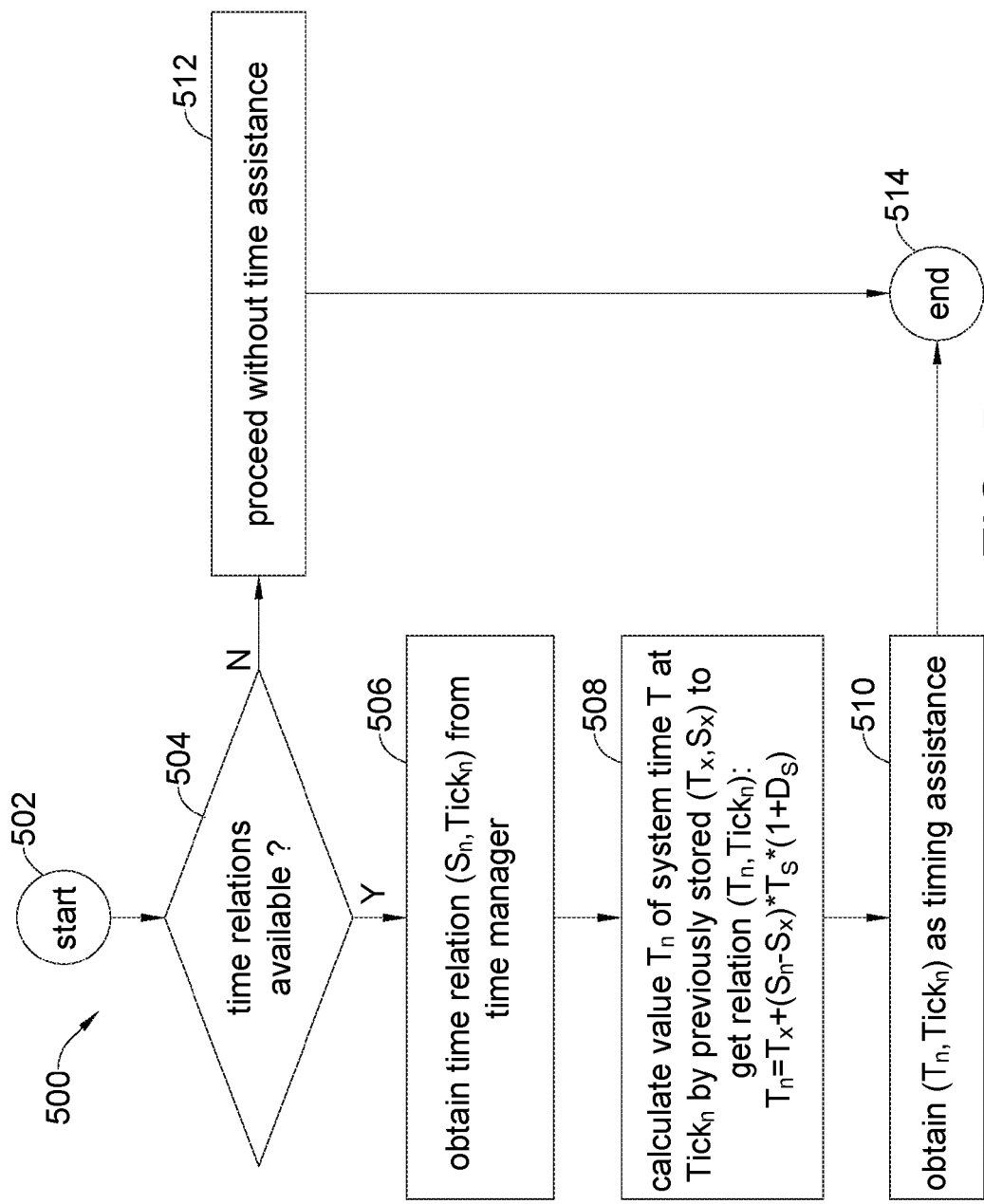
FIG. 5 illustrates a flowchart utilizing a previously stored cross-system time relation and a second system time to provide timing assistance to a first system time by calculating a value of the first system time during absence of synchronization with the first remote system.

Hence, when the interface circuit 102 attempts to resume synchronization with the remote system 12 at the moment $t_b$, the stored time relation $(T_x, S_x, D_S)$ can be utilized to assistant the resynchronization, e.g., to shorten TTFF (time to first fix). Along with FIG. 1 to FIG. 4 and FIG. 6, please refer to FIG. 5 illustrating a flowchart 500 for assisting resynchronization of the system time T according to the system time S and stored cross-system time relation. The flowchart 500 may include the following steps.

Step 502: The interface circuit 102, (e.g., a positioning engine (PE) of the interface circuit 102, not shown) or the processor 120 starts the flowchart 500 at a moment $t_n$ when the interface circuit 102 attempts to resume synchronization with the remote system 12.

Step 504: If a previously stored cross-system time relation (e.g., $(T_x, S_x, D_S)$) is available, proceed to step 506, otherwise proceed to step 512.

Step 506: The interface circuit 102 or the processor 120 obtains a time relation $(S_n, Tick_n)$ built at the moment $t_n$ by the interface circuit 106 following steps 304, 306 and 308 of the flowchart 300.

Step 508: The interface circuit 102 or the processor 120 accesses the stored time relation $(T_x, S_x, D_S)$ updated previously at the moment $t_x$ before the moment $t_a$ at which synchronization with the remote system 12 ends, so as to obtain the stored value $T_x$ of the system time T and the stored value $S_x$ of the system time S, then calculates an expansion interval according to a difference $(S_n-S_x)$ between the value $S_n$ of the system time S and the stored value $S_x$ of the system time S, and sums the stored value $T_x$ of the system time T and the expansion interval.

In an embodiment, calculating the expansion interval may include: multiplying the ideal value of the unit timing duration $T_S$ (mentioned in step 412) with the difference $(S_n-S_x)$; i.e., the expansion interval is calculated by $T_S*(S_n-S_x)$. In an embodiment, calculating the expansion interval may include: calculating a compensation factor $(1+D_S)$ according to the stored clock drift $D_S$ of the stored time relation $(T_x,S_x,D_S)$, multiplying the ideal value of the unit timing duration $T_S$ with the compensation factor $(1+D_S)$ and the difference $(S_n-S_x)$, i.e., the expansion interval is calculated by $T_S*(S_n-S_x)*(1+D_S)$, as shown in FIG. 5 and an operation 612 of FIG. 6.

Step 510: The value $T_n$ of the system T calculated in step 508 according to the stored time relation $(T_x,S_x,D_S)$ may be utilized (e.g., by a measurement engine (ME) of the interface circuit 102, not shown) as an accurate result of performing a first fixing with the satellites of the remote systems 12, TTFF of the interface circuit 102 may hence be effectively shortened.

Step 512: If there is no available stored cross-system time relation between the system times S and T, the interface circuit 102 has to establish synchronization with the remote system 12 all over again without time assistance derived from the stored time relation $(T_{x1},S_x,D_S)$ and the system time S, hence TTFF will be longer.

Step 514: The flowchart 500 ends when the interface circuit 102 achieves synchronization with the remote system 12.

Figure 7:
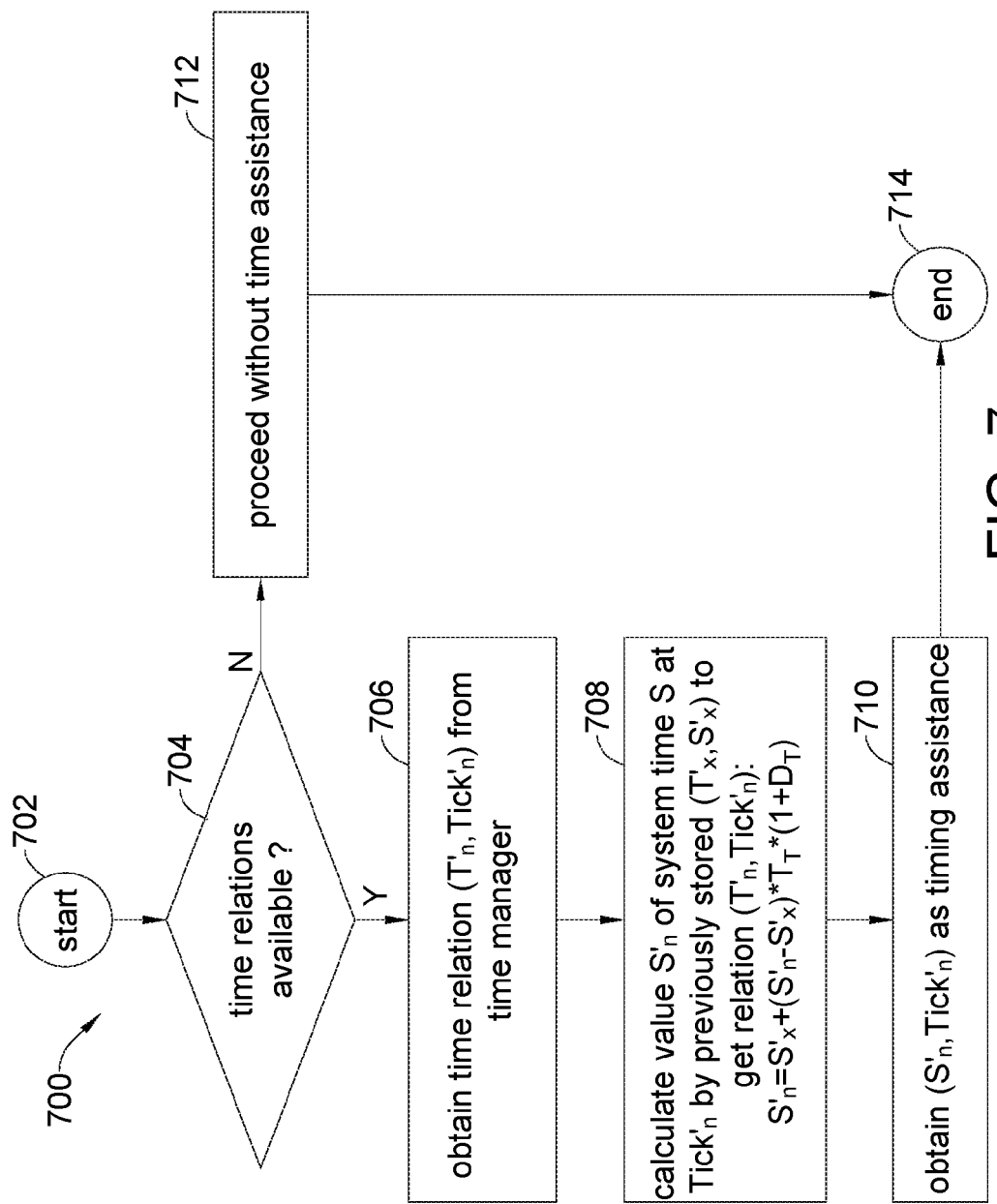
FIG. 7 illustrates a flowchart utilizing a previously stored cross-system time relation and a first system time to provide timing assistance to a second system time by calculating a value of the second system time during absence of synchronization with the second remote system.

While the cross-system time relation $(S,T,D_S)$ may provide timing assistance for resynchronization of the system time T as shown in the operation 612 of FIG. 6 by executing the flowchart 500 of FIG. 5, it may also provide timing assistance for resynchronization of the system time S. Along with FIG. 1 to FIG. 3, please refer to FIG. 7 and FIG. 8; FIG. 7 illustrates a flowchart 700 for assisting resynchronization of the system time S according to the synchronized system time T and a stored cross-system time relation, FIG. 8 illustrates an exemplary scenario applying the flowcharts 200, 300, 400 and 700 respectively shown in FIG. 2, FIG. 3, FIG. 4 and FIG. 7.

Figure 8:
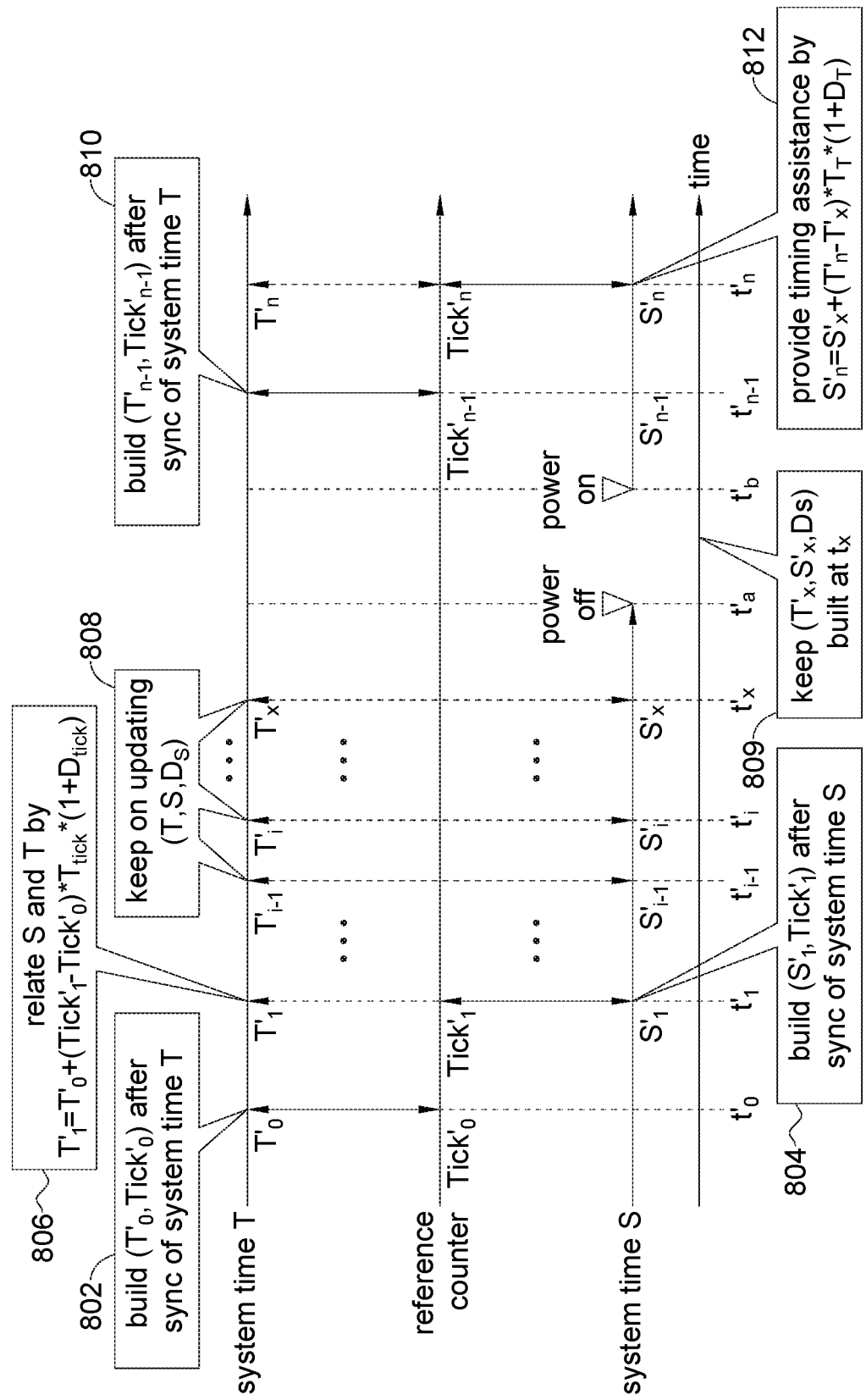
FIG. 8 illustrates an exemplary scenario applying the flowcharts shown in FIG. 2, FIG. 3, FIG. 4 and FIG. 7.

As shown in FIG. 8, at a moment $t'_0$ after the interface circuit 102 has achieved synchronization with the remote system 12, the interface circuit 102 performs a PVT fixing, so a time relation $(T'_0,Tick'_0)$ is built by executing steps 204, 206 and 208 of the flowchart 200, as shown in an operation 802. At a moment $t'_1$ after the interface circuit 106 has achieved synchronization with the remote system 16, the interface circuit 106 performs a frame synchronization, so a time relation $(S'_1,Tick'_1)$ is built by executing steps 304, 306 and 308 of the flowchart 300, as shown in an operation 804. Also at the moment $t'_1$, because both system times S and T are active (step 404 in FIG. 4), and the two time relations $(T'_0,Tick'_0)$ and $(S'_1,Tick'_1)$ respectively correlating the system times T and S to the reference counter 130 are built (step 406), a value $T'_1$ of the system time T is calculated by executing steps 410 of the flowchart 400, and a cross-system time relation $(T'_1,S'_1,D_S)$ is therefore built and stored in the memory 140 by executing steps 412 and 414, as shown in an operation 806.

Steps 410, 412 and 414 of the flowchart 400 may be repeated whenever the interface circuit 102 performs a PVT fixing and/or whenever the interface circuit 106 performs a frame synchronization, as shown in an operation 808 of FIG. 8. For example, while the interface circuits 102 and 106 respectively keep synchronized with the remote systems 12 and 16, the interface circuit 102 performs a PVT fixing at a moment $t'_{i-1}$ and correspondingly obtains a value $T_0$ of the system time T and a count $Tick'_{i-1}$ from the reference counter 130 by a repeated execution of steps 204, 206 and 208, and the interface circuit 106 performs a frame synchronization at a moment $t'_i$ and correspondingly obtains a value $S'_i$ of the system time S and a count $Tick'_i$ from the reference counter 130 by a repeated execution of steps 304, 306 and 308, then the processor 120 calculates a value $T'_i$ of the system time T as $T'_i=T'_{i-1}+(Tick'_i-Tick'_{i-1})*T_{tick}*(1+D_{tick})$ by again executing step 414 of the flowchart 400, and accordingly builds a time relation $(T'_i,S'_i,Ds)$ by executing steps 410, 412 and 414 of the flowchart 400, wherein the clock drift $D_S$ at the moment $t'_i$ may be calculated by $D_S=((T'_{D2}-T'_{D1})/(S'_{E2}-S'_{E1}))/T_S-1$, with two previous values $T'_{D1}$ and $T'_{D2}$ of the system time T obtained by performing PVT fixings respectively at two different previous moments $t'_{D1}$ and $t'_{D2}$ (not shown) which are not later than the moment $t'_i$ (i.e., $t'_{D1}<t'_{D2}\le t'_i$), and two prior values $S'_{E1}$ and $S'_{E2}$ obtained by performing frame synchronizations respectively at two different prior moments $t'_{E1}$ and $t'_{E2}$ (not shown) which are not later than the moment $t'_i$ (i.e., $t'_{E1}=-t'_{E2}\le t'_i$).

In the example of FIG. 8, it is assumed that the interface circuit 106 is powered down (e.g., disabled, inactivated, suspended for power saving, etc.) at a moment $t'_a$ soon after a moment $t'_x$ at which a time relation $(T'_x,S'_x,D_S)$ is built by executing steps 410, 412 and 414 of the flowchart 400, and the interface circuit 106 is powered up at a moment $t'_b$. From the moments $t'_a$ to $t'_b$, since the interface circuit 106 is not active and thus fail to maintain synchronization with the remote system 16, the most recent time relation $(T'_x,S'_x,D_S)$ built at the moment $t'_x$ is stored and kept (step 408 of the flowchart 400), as shown in an operation 809 of FIG. 8, though the interface circuit 102 may remain active and keep repeating steps 204, 206 and 208 to build (update) time relation (T,Tick) between the system time T and the reference counter 130, e.g., to build a time relation $(T'_{n-1},Tick'_{n-1})$ by performing a PVT fixing at a moment $t'_{n-1}$, as shown in an operation 810 of FIG. 8.

Hence, when the interface circuit 106 attempts to resume synchronization with the remote system 16 at the moment $t'_b$, the stored time relation $(T'_x,S'_x,D_S)$ can be utilized to assistant the resynchronization by executing the flowchart 700 shown in FIG. 7. Similar to the flowchart 500, the flowchart 700 may include following steps.

Step 702: The interface circuit 106 or the processor 120 starts the flowchart 700 at a moment $t'_n$ when the interface circuit 106 attempts to resume synchronization with the remote system 16.

Step 704: If previous cross-system time relation (e.g., $(T'_x,S'_x,D_S)$) is available, proceed to step 706, otherwise proceed to step 712.

Step 706: The interface circuit 106 or the processor 120 obtains a time relation $(T'_n,Tick'_n)$ built at the moment $t'_n$ by the interface circuit 102 following steps 204, 206 and 208 of the flowchart 200.

Step 708: The interface circuit 106 or the processor 120 accesses the time relation $(T'_x,S'_x,D_S)$ updated previously at the moment $t'_x$ before the moment $t'_a$ at which synchronization with the remote system 16 ends, so as to obtain the stored value $T'_x$ of the system time T and the stored value $S'_x$ of the system time S, then calculates an expansion interval $(T'_n-T'_x)*T_T*(1+D_T)$ according to a difference $(T'_n-T'_x)$ between the value $T'_n$ of the system time T and the stored value $T'_x$ of the system time T, and sums the stored value $S'_x$ of the system time S and the expansion interval $T_T*(T_n-$ $T_x)^*(1+D_T)$. In an embodiment, calculating the expansion interval $T_T^*(T_n-T_x)^*(1+D_T)$ may include: calculating a compensation factor $(1+D_T)$ according to the stored clock drift $D_S$ of the stored time relation $(T_x,S_x,D_S)$ by $(1+D_T)=1/(T_S^*(1+D_S)^* T_S)$, and multiplying an ideal value of a unit timing duration $T_T$ $(T_1-1T_S)$ with the compensation factor $(1+D_T)$ and the difference $(T'_n-T'_x)$.

Step 710: The value $S'_n$ of the system S calculated in step 508 according to the stored time relation $(T'_x,S'_x,D_S)$ may be utilized as an accurate result of performing a first frame synchronization with the remote systems 16, resynchronization of the interface circuit 102 may hence be effectively speeded up.

Step 712: If there is no available stored cross-system time relation between the system times S and T, the interface circuit 106 has to establish synchronization with the remote system 16 all over again, without time assistance derived from the stored time relation $(T'_x,S'_x,D_S)$ and the system time T.

Step 714: The flowchart 700 ends when the interface circuit 106 achieves synchronization with the remote system 16.

Although aforementioned discussion assumes that the system time S is maintained by the interface circuit 106 (FIG. 1) which may perform frame synchronization with the remote system 16 to obtain value of the system time S in terms of SFN, the system time S may alternatively be maintained by the interface circuit 108 which may perform symbol synchronization with the remote system 18 to obtain value of the system time S in terms of synchronized symbols.

In FIG. 1, the reference counter 130 may be integrated into a same semiconductor chip or die with the processor 120. The memory 140 may be integrated into a same semiconductor chip or die with the processor 120, or the memory 140 may be implemented by a different semiconductor chip separated from the processor 120. The memory 140 may be a volatile memory (e.g., static or dynamic random access memories) or a non-volatile memory (e.g., flash memory).

To sum up, the invention provides mechanism for managing relations of different system times which correspond to different remote systems. The management mechanism associates different system times with a same local reference counter of a terminal (e.g., FIG. 2 and FIG. 3), so value of a system time (e.g., $T_1$ in FIG. 4) at any moment (e.g., $t_1$) may be estimated by extrapolating, and the cross-system time relation can be built (e.g., $(T_1,S_1,D_S)$ in FIG. 4); further, the cross-system time relation can be utilized to provide timing assistant, e.g., for resuming synchronizing with a remote system after ending synchronization with it. It is emphasized that cross-system time relation between different remote systems is built, maintained, and/or updated locally in a terminal without any additional services provided by any remote system; in other words, the cross-system time relation management merely involves local effort of the terminal, does not require large-scale public interoperation or coherence bridging between the different remote systems.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for managing a time relation between system times of different remote systems by a terminal, comprising:
   periodically updating a count of a reference counter according to a local clock of the terminal;
   synchronizing with a first remote system of the different remote systems;
   at a first moment after synchronized with the first remote system, obtaining a first value of a first system time via synchronization with the first remote system, and accessing the reference counter to obtain a first count;
   synchronizing with a second remote system of the different remote systems; and
   at a second moment after synchronized with the second remote system, updating the time relation by:
   obtaining a second value of the second system time via synchronization with the second remote system,
   accessing the reference counter to obtain a second count,
   calculating an extrapolation interval according to a difference between the first count and the second count,
   calculating a second value of the first system time by summing the first value of the first system time and the extrapolation interval,
   calculating a first time difference according to a difference between two previous values of the first system time obtained via synchronization with the first remote system respectively at two different previous moments which are not later than the second moment,
   calculating a second time difference according to a difference between two prior values of the second system time obtained via synchronization with the second remote system respectively at two different prior moments which are not later than the second moment,
   calculating a clock drift according to a ratio of the first time difference and the second time difference, and
   storing the second value of the first system time and the second value of the second system time and the clock drift as updated content of the time relation.

2. The method of claim 1 further comprising:
   at a fourth moment after synchronization with the first remote system ends, calculating a fourth value of the first system time by:
   obtaining a fourth value of the second system time via synchronization with the second remote system,
   accessing a time relation updated at a third moment before synchronization with the first remote system ends, so as to obtain a stored value of the first system time and a stored value of the second system time,
   calculating an expansion interval according to a difference between the fourth value of the second system time and the stored value of the second system time, and
   summing the stored value of the first system time and the expansion interval.

3. The method of claim 2, wherein calculating the expansion interval comprises:
   multiplying a unit timing duration with the difference between the fourth value of the second system time and stored value of the second system time;
   wherein the unit timing duration is associated with a time span per unit value of the second system time.

4. The method of claim 2, wherein calculating the expansion interval comprises:

calculating a compensation factor according to a stored clock drift obtained by accessing the time relation updated at the third moment, and multiplying a unit timing duration with the compensation factor and the difference between the fourth value of the second system time and stored value of the second system time;

wherein the unit timing duration is associated with a time span per unit value of the second system time.

5. The method of claim 1, wherein calculating the extrapolation interval comprises:

multiplying a unit counter duration with the difference between the first count and the second count, wherein the unit counter duration is associated with a time span per count of the reference counter.

6. The method of claim 1, wherein calculating the extrapolation interval comprises:

calculating a system time difference according to a difference between two preceding values of the first system time obtained via synchronization with the first remote system respectively at two different preceding moments which are not later than the second moment, calculating a count difference according to a difference between two preceding counts of the reference counter respectively obtained at the two different preceding moments, calculating a second compensation factor according to a ratio of the system time difference and the count difference, and multiplying a unit counter duration with the second compensation factor and the difference between the first count and the second count, wherein the unit counter duration is associated with a time span per count of the reference counter.

7. The method of claim 1, wherein synchronizing with the first remote system is achieved via a first interface circuit, and the method further comprises:

while obtaining the first value of the first system time and the first count, compensating hardware latencies of the first interface circuit beforehand.

8. The method of claim 1 further comprising:

at a sixth moment after ending synchronization with the second remote system, calculating a sixth value of the second system time by:

obtaining a sixth value of the first system time via synchronization with the first remote system, accessing a time relation updated at a fifth moment before ending synchronization with the second remote system, so as to obtain a stored value of the first system time and a stored value of the second system time, calculating a second expansion interval according to a difference between the sixth value of the first system time and stored value of the first system time, and summing the stored value of the second system time and the second expansion interval.

9. The method of claim 1, wherein the first remote system with the first system time and the second remote system with the second system time are different two of following:

a GNSS (global navigation satellite positioning system) with a system time valued in terms of TOW (time of week), a mobile telecommunication system with a system time valued in terms of SFN (system frame number), and a Wi-Fi network system with a system time valued in terms of symbol timing.

10. A time manager in a terminal for managing a time relation between system times of different remote systems, comprising:

a reference counter periodically updating a count according to a local clock of the terminal, a memory, and a processor coupled to the reference counter and the memory;

wherein the terminal comprises:

a first interface circuit for synchronizing with a first remote system of the different remote systems, and, at a first moment after synchronized with the first remote system, obtaining a first value of a first system time via synchronization with the first remote system, and accessing the reference counter to obtain a first count; and a second interface circuit for synchronizing with a second remote system of the different remote systems, and, at a second moment after synchronized with the second remote system, obtaining a second value of the second system time via synchronization with the second remote system, and accessing the reference counter to obtain a second count, wherein at the second moment, the processor updates the time relation by:

calculating an extrapolation interval according to a difference between the first count and the second count, calculating a second value of the first system time by summing the first value of the first system time and the extrapolation interval, calculating a first time difference according to a difference between two previous values of the first system time obtained via synchronization with the first remote system respectively at two different previous moments which are not later than the second moment, calculating a second time difference according to a difference between two prior values of the second system time obtained via synchronization with the second remote system respectively at two different prior moments which are not later than the second moment, calculating a clock drift according to a ratio of the first time difference and the second time difference, and storing the second value of the first system time and the second value of the second system time and the clock drift in the memory as updated content of the time relation.

11. The time manager of claim 10, wherein at a fourth moment after synchronization with the first remote system ends, the second interface circuit further obtains a fourth value of the second system time via synchronization with the second remote system, and the processor further calculates a fourth value of the first system time by:

accessing a time relation updated at a third moment before synchronization with the first remote system ends, so as to obtain a stored value of the first system time and a stored value of the second system time, calculating an expansion interval according to a difference between the fourth value of the second system time and the stored value of the second system time, and summing the stored value of the first system time and the expansion interval.

12. The time manager of claim 11, wherein calculating the expansion interval comprises:

calculating a compensation factor according to a stored clock drift obtained by accessing the time relation updated at the third moment, and multiplying a unit timing duration with the compensation factor and the difference between the fourth value of the second system time and stored value of the second system time;

wherein the unit timing duration is associated with a time span per unit value of the second system time.

13. The time manager of claim 11, wherein calculating the expansion interval comprises:

multiplying a unit timing duration with the difference between the fourth value of the second system time and stored value of the second system time;

wherein the unit timing duration is associated with a time span per unit value of the second system time.

14. The time manager of claim 10, wherein calculating the extrapolation interval comprises:

multiplying a unit counter duration with the difference between the first count and the second count, wherein the unit counter duration is associated with a time span per count of the reference counter.

15. The time manager of claim 10, wherein calculating the extrapolation interval comprises:

calculating a system time difference according to a difference between two preceding values of the first system time obtained via synchronization with the first remote system respectively at two different preceding moments which are not later than the second moment, calculating a count difference according to a difference between two preceding counts of the reference counter respectively obtained at the two different preceding moments, calculating a second compensation factor according to a ratio of the system time difference and the count difference, and multiplying a unit counter duration with the second compensation factor and the difference between the first count and the second count, wherein the unit counter duration is associated with a time span per count of the reference counter.

16. The time manager of claim 10, wherein while obtaining the first value of the first system time and the first count, the first interface circuit further compensates hardware latencies of the first interface circuit beforehand.

17. The time manager of claim 10, wherein at a sixth moment after ending synchronization with the second remote system, the first interface circuit further obtains a sixth value of the first system time via synchronization with the first remote system, and the processor further calculates a sixth value of the second system time by:

accessing a time relation updated at a fifth moment before ending synchronization with the second remote system, so as to obtain a stored value of the first system time and a stored value of the second system time, calculating a second expansion interval according to a difference between the sixth value of the first system time and stored value of the first system time, and summing the stored value of the second system time and the second expansion interval.

18. The time manager of claim 10, wherein the first remote system with the first system time and the second remote system with the second system time are different two of following:

a GNSS (global navigation satellite positioning system) with a system time valued in terms of TOW (time of week), a mobile telecommunication system with a system time valued in terms of SFN (system frame number), and a Wi-Fi network system with a system time valued in terms of symbol timing.

* * * * *